US011610165B2

United States Patent
Sankar et al.

(10) Patent No.: US 11,610,165 B2
(45) Date of Patent: Mar. 21, 2023

(54) METHOD AND SYSTEM FOR ORCHESTRATING MULTI-PARTY SERVICES USING SEMI-COOPERATIVE NASH EQUILIBRIUM BASED ON ARTIFICIAL INTELLIGENCE, NEURAL NETWORK MODELS, REINFORCEMENT LEARNING AND FINITE-STATE AUTOMATA

(71) Applicant: Volvo Car Corporation, Gothenburg (SE)

(72) Inventors: Krishna Sankar, Mountain View, CA (US); Vedad Cajic, Mountain View, CA (US); Usha Nookala, Mountain View, CA (US); Jonas Fenn, Mountain View, CA (US)

(73) Assignee: Volvo Car Corporation, Gothenburg (SE)

( * ) Notice: Subject to any disclaimer, the term of this patent is extended or adjusted under 35 U.S.C. 154(b) by 731 days.

(21) Appl. No.: 16/120,503

(22) Filed: Sep. 4, 2018

(65) Prior Publication Data

US 2019/0347371 A1 Nov. 14, 2019

Related U.S. Application Data

(60) Provisional application No. 62/668,904, filed on May 9, 2018.

(51) Int. Cl.
*G06Q 10/06* (2012.01)
*G06Q 30/02* (2012.01)
(Continued)

(52) U.S. Cl.
CPC ....... *G06Q 10/06315* (2013.01); *G06Q 10/04* (2013.01); *G06Q 10/06312* (2013.01);
(Continued)

(58) Field of Classification Search
CPC ....... G06Q 10/06315; G06Q 10/06312; G06Q 10/04; G06Q 50/30; G06Q 30/0201;
(Continued)

(56) References Cited

U.S. PATENT DOCUMENTS 8,468,041 B1 6/2013 Venerov
9,818,297 B2 * 11/2017 El-Tantawy ........... G08G 1/081
(Continued)

OTHER PUBLICATIONS

Busoniu, L., et al. "A Comprehensive Survey of Multiagent Reinforcement Learning" IEEE Transactions on Systems Man & Cybernetics—Part C: Applications & Reviews, vol. 38, No. 2, pp. 156-172 (2008) (Year: 2008).*
Arulkumaran, K., et al. "A Brief Survey of Deep Reinforcement Learning" IEEE Signal Processing Magazine: Special Issue on Deep Learning for Image Understanding (2017) (Year: 2017).*
(Continued)

*Primary Examiner* — Jay Hann
(74) *Attorney, Agent, or Firm* — Clements Bernard Walker; Christopher L. Bernard

(57) ABSTRACT

Distributing resources in a predetermined geographical area, including: retrieving a set of metrics indicative of factors of interest related to operation of the resources for at least two parties, each having a plurality of resources, retrieving optimization policies indicative of preferred metric values for each party, retrieving at least one model including strategies for distributing resources in the predetermined area, the at least one model based on learning from a set of scenarios for distributing resources, retrieving context data from real time systems indicative of at least a present traffic situation, establishing a Nash equilibrium between the metrics in the optimization policies of the at least two parties taking into account the at least one model and the context data, distributing the resources in the geographical area according to the outcome of the established Nash equilibrium.

19 Claims, 8 Drawing Sheets

(51) Int. Cl.
*G06Q 10/04* (2012.01)
*G06Q 50/30* (2012.01)
*G06Q 10/0631* (2023.01)
*G06Q 30/0201* (2023.01)
*G06N 20/00* (2019.01)
*G06Q 30/0202* (2023.01)
*G06N 3/04* (2023.01)

(52) U.S. Cl.
CPC ......... *G06Q 30/0201* (2013.01); *G06Q 50/30* (2013.01); *G06N 3/0445* (2013.01); *G06N 20/00* (2019.01); *G06Q 30/0202* (2013.01)

(58) Field of Classification Search
CPC ........... G06Q 30/0202; G06Q 30/0205; G06N 3/0445; G06N 20/00; G06N 3/0454; G06N 3/08
See application file for complete search history.

(56) References Cited

U.S. PATENT DOCUMENTS

| | | | |
|---|---|---|---|
| 10,019,671 B2* | 7/2018 | Ulloa Paredes | G08G 1/005 |
| 10,482,559 B2* | 11/2019 | Djuric | G06Q 50/30 |
| 10,726,644 B2* | 7/2020 | Abari | G06Q 10/20 |
| 2017/0248963 A1 | 8/2017 | Levinson et al. | |
| 2017/0277195 A1 | 9/2017 | Frazzoli et al. | |
| 2018/0032082 A1 | 2/2018 | Shalev-Shwartz et al. | |
| 2019/0171988 A1* | 6/2019 | Kwatra | G06Q 10/06314 |
| 2019/0312779 A1* | 10/2019 | Magzimof | H04M 11/08 |
| 2019/0339087 A1* | 11/2019 | Jindal | G06N 3/088 |

OTHER PUBLICATIONS

Jul. 11, 2019 European Search Report issue on International Application No. EP19171027.

* cited by examiner

| Metric | Customer | Mobility Service Operator | Package Delivery Operator | City | Charging Station Operator |
|---|---|---|---|---|---|
| ϕ = Wait time | Minimize | | Minimize | Minimize | |
| $ = Cost to customer | Minimize | | | | |
| $ = Revenue to the operator | | Maximize | | | Maximize |
| τ = Traffic flow | | | | Maximize | |
| τ¹ = Package Flow/Delivery time | | | Maximize | Maximize | |
| η = Experience | Maximize | | | | |
| ξ = Explore (Autonomous Cars) | | Maximize | Minimize | Maximize | |
| β = Brand value | | Maximize | Maximize | Maximize | |
| ρ = Business Risk | | | | | |
| R = Retention Rate | | | | | |
| M = Market share | | | | | |
| GDP = Gross Revenue to city | | | | Maximize | |
| Popularity | | | | | |

Fig. 4

METHOD AND SYSTEM FOR ORCHESTRATING MULTI-PARTY SERVICES USING SEMI-COOPERATIVE NASH EQUILIBRIUM BASED ON ARTIFICIAL INTELLIGENCE, NEURAL NETWORK MODELS,REINFORCEMENT LEARNING AND FINITE-STATE AUTOMATA

CROSS-REFERENCE TO RELATED APPLICATION

The present patent application/patent claims the benefit of priority of U.S. Provisional Patent Application No. 62/668,904, filed on May 9, 2018, and entitled "METHOD AND SYSTEM FOR ORCHESTRATING MULTI-PARTY SERVICES USING SEMI-COOPERATIVE NASH EQUILIBRIUM BASED ON ARTIFICIAL INTELLIGENCE, NEURAL NETWORK MODELS, REINFORCEMENT LEARNING AND FINITE-STATE AUTOMATA," the contents of which are incorporated in full by reference herein.

FIELD OF THE INVENTION

The present invention relates to a method and system for distributing resources in a predetermined geographical area.

BACKGROUND OF THE INVENTION

In recent years, human-assisted self-driving vehicles and fully autonomous vehicles have received more attention. An autonomous vehicle may be able to navigate a transport through a city by itself, without any active interference by a human operator.

An autonomous vehicle requires relatively complicated programming and machine learning algorithms to be able to make fast and accurate decisions in real-time. In human assisted self-driving vehicles, there is still a human operator to control the vehicle in some critical situations.

For a group of autonomous vehicles to drive in an area, such as a city, and avoid collisions, it may be perceived that they share information, such as location, speed, and travelling direction between each other. The vehicles may also be equipped with proximity sensors and cameras for identifying obstacles and objects near the vehicle. Accordingly, for travelling through the city, the vehicles may identify and avoid objects near the vehicle, as well as plan routes by knowledge about other vehicles near the vehicle.

By the introduction of autonomous vehicles or human-assisted self-driving vehicles, transportation for people and delivery services may be provided by fleets of self-driving vehicles. The driving control of autonomous vehicles for specific traffic situations is becoming well explored, however, over a large scale, such as an entire city, it is of interest how to distribute the vehicles, or other service units, across the city in the most efficient way.

Accordingly, there is a need for ways of distributing of service units across an area such as to meet a service demand in the city.

SUMMARY OF THE INVENTION

In view of the above, it is an object of the present invention to provide an improved method for distributing resources in a predetermined geographical area.

According to a first aspect of the invention, there is provided a method for distributing resources in a predetermined geographical area, the method including: retrieving a set of metrics, the metrics indicative of factors of interest related to operation of the resources for at least two parties, each party having a plurality of resources, retrieving optimization policies indicative of preferred metric values for each of the at least two parties, retrieving at least one model including strategies for distributing resources in the predetermined area, the at least one model based on learning from a set of scenarios for distributing resources, retrieving context data from real-time systems, the context data indicative of at least a present traffic situation, establishing a Nash equilibrium between the metrics in the optimization policies of the at least two parties taking into account the at least one model and the context data, distributing the resources in the geographical area according to the outcome of the established Nash equilibrium.

The present invention is based on the realization to apply Nash equilibrium to optimization policy metrics and at the same time take into account models including strategies for the distribution of resources in order to find an at the moment advantageous distribution of the resources in the predetermined area. Further, it is realized to apply Nash equilibrium to a continuous dynamic process, e.g. to resources being mobile in the predetermined area without discrete states, which means that the conditions for the resources may change, and not necessarily in a deterministic way as is the case with discrete processes. For example, an optimization policy may suddenly change, whereby the Nash equilibrium will also change, whereby the inventive concept takes that into account by using the Nash equilibrium to determine the distribution of resources.

Nash equilibrium is a state where one party will not improve its position by changing its optimization policy while the other parties maintain their optimization policies. Thus, the Nash equilibrium may be a steady state with respect to the metrics that a party cares about. For example, for a city, the Nash equilibrium may be max revenue, the roads full, but not congested and the customers have enjoyed the mobility service (as reflected by ratings). The property of Nash equilibrium is thus that the participants do not have an incentive to change their parameters (e.g. price, street conditions, etc.).

The Nash equilibrium in accordance with the inventive concept may be a semi-static Nash equilibrium, which may still allow a small deviation in the parties' model strategy without compromising the Nash equilibrium state. Thus, Nash equilibrium in accordance with the inventive concept may be considered to be in a state of equilibrium even if the Nash equilibrium is not fully satisfied, but within a tolerance ($\epsilon$).

The metrics are factors that are important for each of the parties. Example metrics are wait time, cost, revenue, traffic flow, delivery time, experience, explored area, brand value, business risk, retention rate, market share, popularity, gross revenue to city, etc. This list of metrics is non-exhaustive.

The optimization policies are the preferred values for each of a set of metrics that are of importance for the specific party. Further, the metrics of the optimization policies may be weighted, for instance 0.75*Revenue+0.25*Retention.

A model provides a set of algorithms that describe possible outcomes based on input data. The model consists of constants, parameters, probabilities, action trees, graphs with edges and nodes and so forth. The trees and graphs would have their own multiple attribute sets at every node and edge. A model may take e.g. context data and optimization policies as input that provide a predicted outcome based on previous training and the input. In establishing Nash equilibrium, the different possible outcomes are weighted against each other, and the optimization policies may have to be changed in order to establish Nash equilibrium. From establishing Nash equilibrium, the resources may be distributed in the geometrical area in an at-the-moment most advantageous distribution for the parties.

A strategy may be e.g. a plan, a policy and a course of action. For example, every distribution state has a set of next actions and a set of rewards associated with each action. Such rewards may be local or cumulative. One way of expressing a policy is with a probability distribution for every action. For example, a policy might be to move the resources randomly if the utilization is less than 25%. Another policy might be to triple the price if a higher demand is determined (e.g. if the optimization policy includes to maximize revenue). Distributing of resources may refer to several types of resources. For instance, move autonomous vehicles to more advantageous location in the predetermined area with respect to mobility demand or charging (in the case of electric vehicle for utilizing the power grid in a safe and efficient way), explore the city in order to learn more for the specific autonomous vehicle or orchestrate vehicle related functions, such as cleaning and maintenance services.

A party may, for example, be a mobility service provider or a package delivery operator, a charging station operator or a city. Thus, the established Nash equilibrium could be between a first party being a mobility service provider and a second party being the city itself. Accordingly, the city may have in its optimization policy to avoid high volume traffic on certain routes in order to avoid traffic congestion, and the mobility service provider may want to maximize profit. In Nash equilibrium, the mobility service provider may not send all its resources to the routes indicated in the city's optimization policy because it may cause traffic congestions, which mean the resources will be stuck in traffic and not provide profit.

Another possible scenario is that a charging station provider for electric vehicles may desire that only a maximum number of electric vehicles are charged at the same time. In Nash equilibrium, a mobility service provider managing electric vehicles may thus not send all its vehicles for charging at the same time.

A further scenario is that a first party is a mobility service provider and a second party is a customer requesting a mobility service. There may further be several parties being mobility service providers that compete for the customer.

In some embodiments, there is included to receive a request for a resource, the request including a set of preferred metrics, and establish the Nash equilibrium based further on the request. The request may come from a customer with its own preferences. For example, a student travelling on a Tuesday morning may have a set of preferred metrics that differ from the preferred metrics of high-end restaurant visitor on a Saturday night. Nash equilibrium is then established between the preferred metrics and the optimization metrics of the parties.

Further, in some embodiments, an offer may be provided based on the request and the outcome of the established Nash equilibrium, receiving a response to the offer, and distributing the resources further based on the response. Accordingly, the outcome of establishing Nash equilibrium (or at least near Nash equilibrium) may result in an offer made to the source of the request. The source of the request may choose to accept or decline the offer.

The models may be trained from reinforcement learning algorithms. Accordingly, by using reinforcement learning the model may be trained based on optimization policies and by using Nash equilibrium as a reward function for the reinforcement learning. The reinforcement learning algorithm may be a deep reinforcement learning algorithm.

In some possible implementations, the deep reinforcement learning algorithm may be a multi-layer convolutional neural network including optional recurrent or recursive layer.

According to some possible embodiments, the method may include calculating adaptation factors for a further geographical area not included in the predetermined area based on at least area size and population density at places of interest, scaling properties of the model for the predetermined area to the further area to form an adapted model, and using the adapted model for distributing resources in the further area. Accordingly, if the models have been developed for a predetermined area, for example the city of Los Angeles, it may be possible to scale those models to a smaller city, such as Las Vegas, and then use the adapted models for implementing the inventive concept in the city not previously modelled. Accordingly, the method may advantageously be used for other areas than the predetermined area. The adaptation factors may be based on city size, city area, demographics, number of vehicles, etc. The demand model may be a modelled distribution of demand across the predetermined area.

According to further embodiments, the method may include constructing a demand model based on a demand meta-model, context data and place, the demand model adapted to predict transportation need, constructing an acceptance model based on the demand model, party mobility preferences, and transportation options, the acceptance model adapted to predict transportation preferences, generating an intent model based on the arrival point and venue, and establishing the Nash equilibrium based further on the demand model, the acceptance model, and the intent model.

The context may be e.g. time of day, bridge opening, traffic intensity, whether there is an event in the area (e.g. concert, game, etc.). A demand model may provide a distribution of resource demand throughout the city. For example, that there may be high or low demand in a certain sub-area. The acceptance model may provide what type of transportation that is acceptable for a resource enquirer. With the demand acceptance and choice models is it possible to distribute the resources more accurately with respect to demand in the predetermined area.

The acceptance model may further be based directly on the context data, instead of indirectly from the demand model.

The demand acceptance and choice models may be generated based on reinforcement learning. Accordingly, the method may include receiving real time context data, and updating the demand model, the acceptance model, and the choice models based on the real time context data to improve the models further.

In addition, to improve the accuracy of the predicting the demand, the method may include generating the optimization policies based on the demand model, the acceptance model, and the choice model, and reinforcement learning algorithms.

The resources may be mobility units, such as goods, boats, semi-self driving vehicles, autonomous vehicles, etc.

The reinforcement learning mechanism may be for example at least one of Partially Observable Markov Decision Process, Policy Gradient, DeepQ Learning, Actor Critic Method, Monte Carlo tree search, and the Counterfactual Regret Minimization technique.

According to embodiments of the invention, Nash equilibrium may be satisfied when the equilibrium between the sets of metrics in the optimization policies is within an allowed deviation ($\epsilon$).

According to a second aspect of the invention, there is provided a system for distributing resources in a predetermined geographical area, the system including: a control unit configured to: retrieve a set of metrics, the metrics indicative of factors of interest related to operation of the resources for at least two parties, each party having a plurality of resources, retrieve optimization policies indicative of preferred metric values for each of the at least two parties, retrieve at least one model including strategies for distributing resources in the predetermined area, the at least one model based on learning from a set of scenarios for distributing resources, retrieve context data from real-time systems, the context data indicative of at least a present traffic situation, establishing a Nash equilibrium between the metrics in the optimization policies of the at least two parties taking into account the at least one model and the context data, and distribute the resources in the geographical area according to the outcome of the established Nash equilibrium.

The system may further include a simulator module configured to: generate the model strategies based on reinforcement learning algorithms.

In some embodiments, the simulator module may be configured to: generate a demand model based on a demand meta-model, a context and place, the demand model adapted to predict transportation need, generate an acceptance model based on the demand model, party mobility preferences, and transportation options, the acceptance model adapted to predict transportation preferences, generate an intent model based on the arrival coordinate and venue, wherein the control unit module is configured to: establish the Nash equilibrium based further on the demand model, the acceptance model, and the intent model.

The control unit and the simulator module may be arranged on the server.

This second aspect of the invention provides similar advantages as discussed above in relation to the previous aspect of the invention.

According to a third aspect of the invention, there is provided a computer program product including a computer readable medium having stored thereon computer program means for distributing resources in a predetermined geographical area, wherein the computer program product includes: code for retrieving a set of metrics from a simulation, the metrics indicative of factors of interest related to operation of the resources for at least two parties, each party having a plurality of resources, code for retrieving optimization policies indicative of preferred metric values for each of the at least two parties, code for retrieving at least one model including strategies for distributing resources in the predetermined area, the at least one model based on learning from a set of scenarios for distributing resources, code for retrieving context data from real time systems, the context data indicative of at least a present traffic situation, code for establishing a Nash equilibrium between the sets metrics in the optimization policies of the at least two parties taking into account the at least one model and the context data, and code for distributing the resources in the geographical area according to the outcome of the established Nash equilibrium.

This third aspect of the invention provides similar advantages as discussed above in relation to the above mentioned aspects of the invention.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein:

FIG. 4 is a table of example metrics for several parties;

DETAILED DESCRIPTION OF EXAMPLARY EMBODIMENTS

Figure 1:
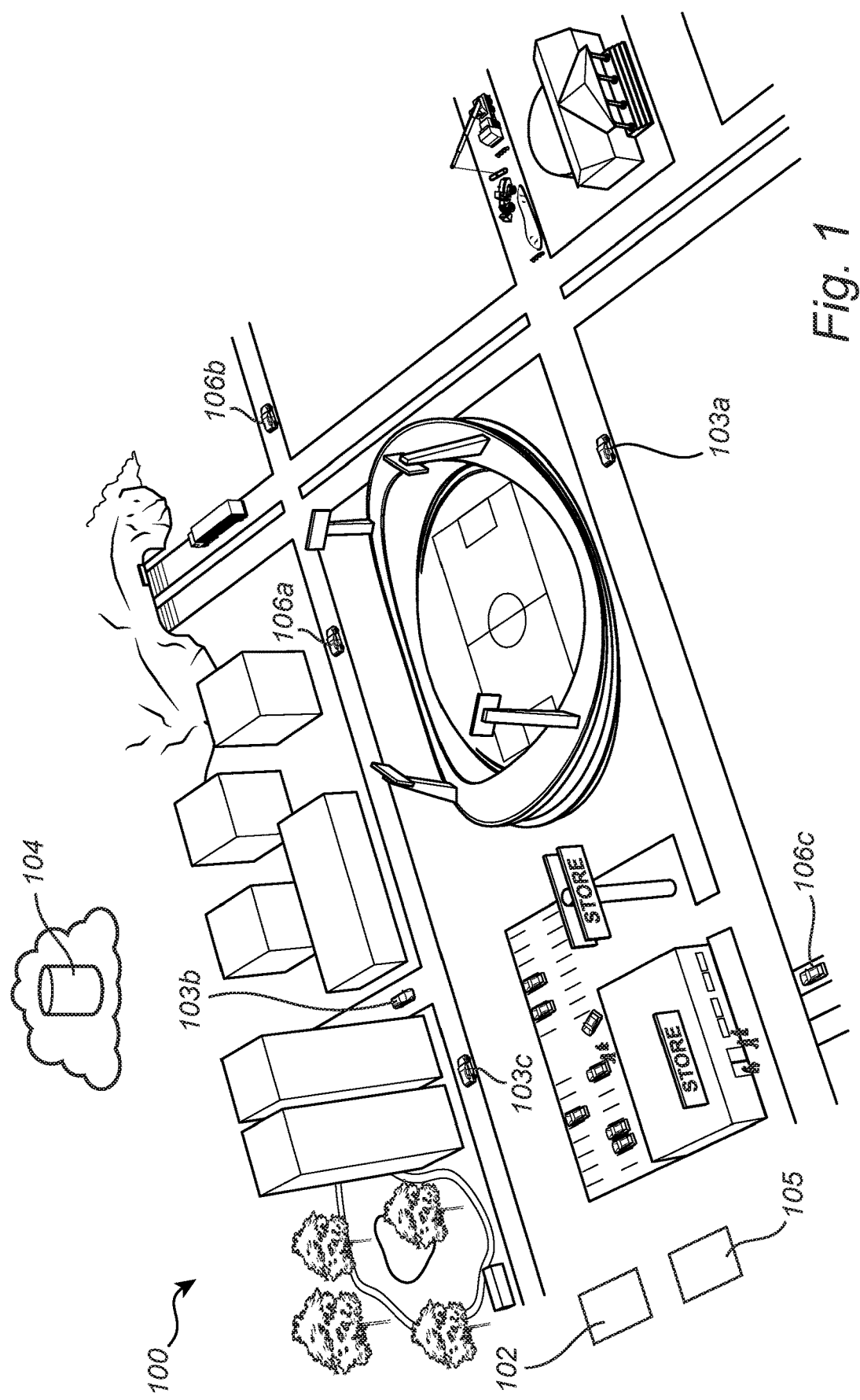
FIG. 1 conceptually illustrates the application of embodiments of the invention.

In the present detailed description, various embodiments of the system and method according to the present invention are mainly described with reference to distributing resources in the form of a vehicle. However, the present invention may equally be used with other resources, such as charging stations for electric vehicles, parking lots, package delivery systems, metro lines planning, bike sharing distributions, public transportation planning, etc. Thus, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 conceptually illustrates application of the invention. In FIG. 1, two parties each have a fleet of autonomous vehicles (or human-assisted self-driving vehicles). Party 102 has three autonomous vehicles, 103a, 103b, and 103c, in its fleet, and party 105 has three autonomous vehicles, 106a, 106b, and 106c, in its fleet. Here, for clarity, only three vehicles are shown in each fleet, and only for two parties. However, the invention is applicable to several parties having any number of resources in its fleet, e.g. hundreds of vehicles. Furthermore, a party may also be the city itself (e.g. the infrastructure), charging station provider, etc.

The autonomous vehicles 103a-c, 106a-c of the two fleets compete in a predetermined area 100 including various agents, such as places of interest (such as stadiums, museums, parks, etc.), cars, roads, road works, parking spaces, charging stations, bridges, tunnels, etc. (not numbered). The objectives of the fleets are to provide mobility services to customers in the predetermined area 100. In some embodiments, the fleets have access to the choice and acceptance models of their customers, which are probabilistic distributions describing transportation preferences and preferred activities of their customers at the present time and day. The acceptance models and choice models will be described further with reference to FIG. 3.

In order to understand the real world and thereby operate in the predetermined area 100, control units of the vehicles 103a-c, 106a-c run simulations, preferably in the cloud 104, which generates a vast number of scenarios (e.g. thousands or more) running thousands (or more) of times using reinforcement learning. From the simulation runs, they may arrive at values for strategies for models which assist the control unit to navigate and operate the respective vehicle in the predetermined area 100. Each of the parties 102 and 105 has its respective optimization policy, which provides a strategy for a Nash equilibrium simulation. Then, in simulation, Nash equilibrium is derived where model strategies converge to a sustainable state (Nash equilibrium). The various agents (e.g. places of interest, cars, roads, road works, parking spaces, charging stations, bridges, tunnels, etc.) in the simulated grid worlds may be modelled with lifetimes and behaviors. The parties 102, 105 can then deploy their model strategies in the predetermined area (i.e. the "real world") and also learn from the real world to refine their models.

Figure 2:
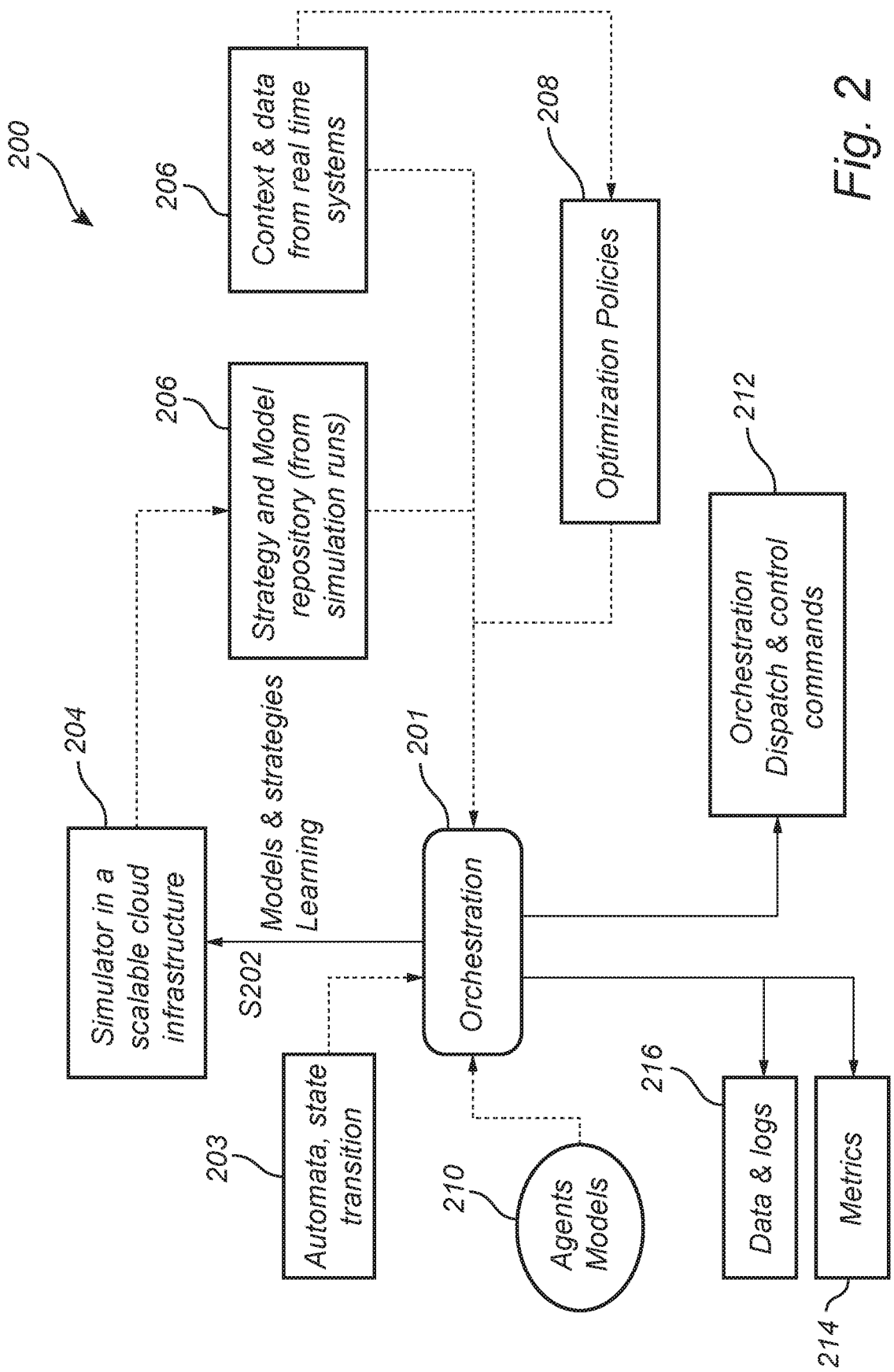
FIG. 2 is a conceptual functional flowchart illustrating embodiments of the invention.

FIG. 2 illustrates a functional flow-chart for embodiments of the invention. FIG. 2 illustrates a system 200 for distributing resources. A control unit 201 for orchestration of the resources is configured to receive context data 202 including information about the present traffic situation, e.g. example traffic feeds, event details, weather, status of electrical charging stations, etc. The control unit 201 further receives models 210 of the agents (e.g. stadiums, museums, parks, cars, roads, road works, parking spaces, charging stations, bridges, tunnels, etc.), i.e. behavior of the agents in different situations, and models 203 for state transitions, i.e. parking state transitions, charging state transitions, exploring transitions, and moving transitions for the autonomous vehicle.

The exploring transitions occur for instance when an autonomous car is not busy and the system deploys the vehicles to explore a coverage area. The moving transition may be an operation decision based on the discrepancy between the predicted demand and the location of the vehicles. For example, vehicles 103a-c may be at the outskirts of the predetermined area 100 but a demand is projected at a soon to be over concert or ball game. In this case, in order to minimize the wait time, the vehicles could be controlled to travel to a location near the location of the predicted increased demand.

Further, a simulator module 204 is configured to generate models including strategies for distributing resources based on reinforcement learning and to provide the models 206 to the control unit 201. Moreover, the control unit 201 retrieves optimization policies 208 indicative of preferred metric values for each of at least two parties operating in the predetermined area 100. The control unit 201 outputs commands 212 and controls to affect the resources in the predetermined area 100.

The system 200 includes is a set of machine learning modules and neural networks, as well as rules, supervisory controls and other modules.

The system control unit 201 also feeds back S202 into the simulator module 204, for it to learn from real time actual events. This feedback loop is advantageous for learning because, as much as the simulator module 204 can simulate a large number of conditions, it cannot still fully comprehend how the agents behave in real world. The real world feedback data and model strategies would have appropriately higher weightage to influence and complement the simulation learnings by the simulator module 204.

Figure 3:
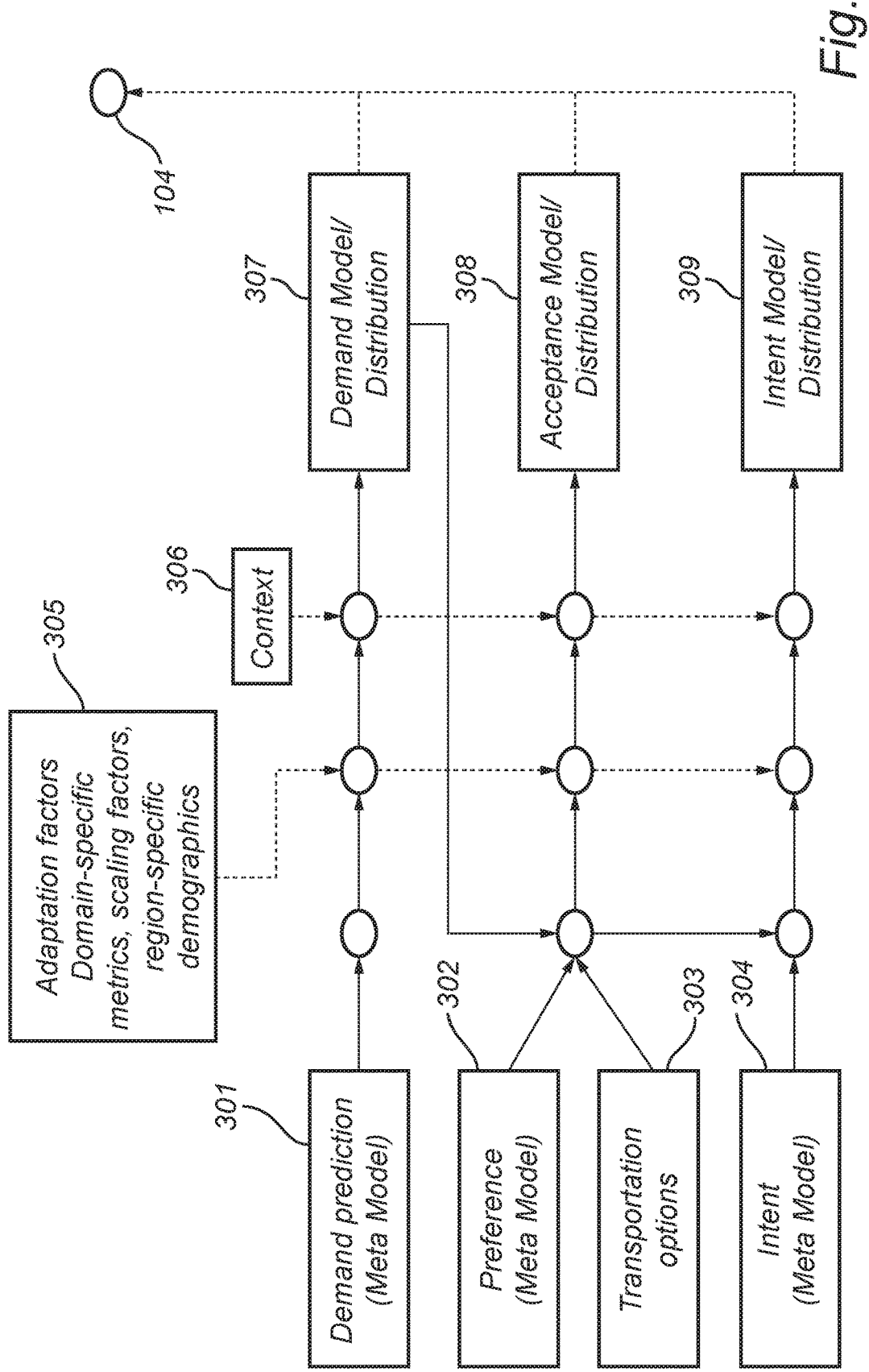
FIG. 3 conceptually illustrates the generation of a demand model, an acceptance model and a choice model.

FIG. 3 conceptually illustrates the generation of a demand model 307, an acceptance model 308 and an intent model 309. The models 307-309 are provided in the form of probabilistic distributions such as Poisson distributions.

The simulator module (204 in FIG. 2) receives meta-models (301, 302, 303, 304) for data for various parts of the input system. The meta-models (301, 302, 303, 304) may be created from actual data of different modalities (e.g. different types of transportations, weather data, time, different user groups based on e.g. age, demographics, etc.) and then customized for a specific instance of simulation by adaptation factors 305 (e.g. if a different predetermined area is considered) and then dynamically adjusted by real time context 306. In short, the models outcomes (307, 308, 309) are constructed from meta-models 301-304 trained by actual data from different and varied sources and then adopted by specific factors (305) and then scaled by context 306. The actual data used for training the models may be taxi cab data, game attendance, concert details, traffic conditions and so forth for 1-2 years (spanning holidays, working days, cold days, summer days, etc.) from potential major cities.

The demand prediction meta-model 301 may be a deep learning neural network model that is trained for a particular predetermined area, usually a geographic location having associated context data 306. The context data 306 may include time of day, day of week, day of month, holidays, places of interest, special events, etc. The model 301 would have been trained in a deep learning neural network with lots of different data such as cab hailings, transport data from public transport, government data (for example vehicle data that is to be reported mandatory in various countries).

This meta-demand model 301 may for instance be able to predict demand on a Monday morning (students and workers), Thanksgiving day (holiday crowd), to and from a concert or a ball game, weekend demand, tourist demand on a summer day, home returning crowd on a rainy or snowy day evening and so forth.

In addition, the demand prediction meta-model 301 is aggregated across all transportation modes (walking, cabs, shared rides, public transportation, park-n-go and so forth). Accordingly, the demand meta-model 301 may provide a distribution of the demand at a given time interval (say 9:00 AM-10:00 AM Monday morning January in New York) based on the parameters. Normally this distribution is quite limited in scope and may be used in a relatively restricted fashion.

A first step to generate the demand model 307 for a specific context and predetermined area is to apply an adaptation model (305) that adopts this specific model 301 to a different condition—for example a Tuesday Morning student commute on a winter day in New York can be scaled (not linearly but based on a neural model) to a January Tuesday morning traffic in Gothenburg, where there is a similarity in the availability of public transport and in the climate. Adaptation of the model 301 to Los Angeles where the climate and transportation options are different may need a different model that is directionally correct but needs additional parameters.

The next step is to apply context 306 (i.e. by inputting another parameter into the trained model) to the demand meta-model 301. For instance, it may occur that this Tuesday in January is a local holiday, and there is a traffic jam, or a bridge closing, or a playoff ball game and the local team is a favorite in which case there would likely be a full crowd till the end of the game. The contextual scaling provided by the context data 306 provides advantageous ability to simulate a variety of possibilities and learn from them.

The demand meta-model 301 after the inclusions of the adaptation factors 305 and the context layer 306 results in a demand model 307 that provides a probabilistic distribution (e.g. a Poisson distribution), i.e. how many people would need transportation from this general location at this hour and what is the arrival rate at the origin. The arrival at a location may be modelled as a poisson distribution and the arrival rate is a parameter to the distribution.

The adaptation factors 305 context 306 serves as the multi-dimensional scaling factor for the predictions of demand. For example, the demand model 307 may predict that x % of a crowd will use public transport and y % will use autonomous cars. A demand model 307 based on data from previous events (ball games, concerts, etc.) at different cities would need to be customized for this event (which might have less crowd size) and say weather (rainy or cold day as opposed to a sunny afternoon). These may not be only linear models, but may need a multi-dimensional multi modal complex model (like a deep neural network) which takes in dynamic contextual input; in other words, the models may have a plurality of dimensions, with parameters and training may be performed using data from different domains as well as a rich set of customization via context and adaptation factors. Thus the simulator module will feed in different contextual scenarios and run lots of simulations.

The preference meta-model 302 provides a persona-based preference that is an overlay over the available transportation options 303. A mobility ride sharing entity can use the simulator module to add more ride sharing options and see how it can increase its share. Another alternative application may be that a metro operator can evaluate if it is possible to increase use of public transport by adding more trains or buses to a specific route.

Accordingly, the preference model 302 is contextual and persona based. For instance, a student population can be incentivized to take public transport by increasing the availability of public transport, but for an academy Oscar award crowd, a mobility operator with higher end vehicles would get more business; but for a music festival, more ride sharing or public transport may be an advantageous choice for the mobility providers (e.g. the parties). Moreover, preferences for the users of mobility services may also be used for increasing the range and capacity of autonomous electric vehicles temporarily for an event or for a time.

The preference meta-model 302 is overlaid on the demand distribution results in the acceptance distribution 308 for multiple transportation options 303—while the demand model distribution 307 is a single curve, the acceptance distribution 308 is a set of distribution curves.

A further model is the intent meta-model 304. For instance, it may be possible to know how many people would need transportation every unit of time (say hourly) and also how they would travel. The intent model 304 adds what the users plan to do once they reach their destination. For example, the users may be going home at the end of a working day, or to find places to eat (with specificity) or go to a concert, etc. The intent model 304 usually combines multimodal data from check-ins, travel logs, resolving places data with drop offs (i.e. use intelligent APIs to figure out the most probable place a person would visit after a drop off at a GPS coordinate).

The intent meta-models 304 are adopted and contextualized resulting in another set of distributions 309 (an intent model 309) based on intent. The distributions 309 (e.g. Poisson) would be concentrated or distributed depending on the destination, e.g. if the destination is a ball game or a concert there will be a lot of people going there, but the demand out of a ball game on a summer evening would be distributed to multiple places, say burger joints, an Italian place, many going back to residential neighborhoods, etc.

The simulator module may thus generate a host of demand, transportation options, preferences and intent based on models trained from multimodal data from a plurality of sources and locations, and it can adopt the models to a specific location and a specific context.

FIG. 4 is a table of example metrics for several types of parties. In this table, the party categories are a customer, a mobility service an operator, a package delivery operator, a city, and a charging station operator. There may be more than one party in each category. An optimization policy may be formed from e.g. simulations and may for example be, for a Mobility Operator: Max($, β, ζ, R, M), Min(ρ), for a package delivery operator: Max(τ1, $, β), Min(ρ).

Figure 5:
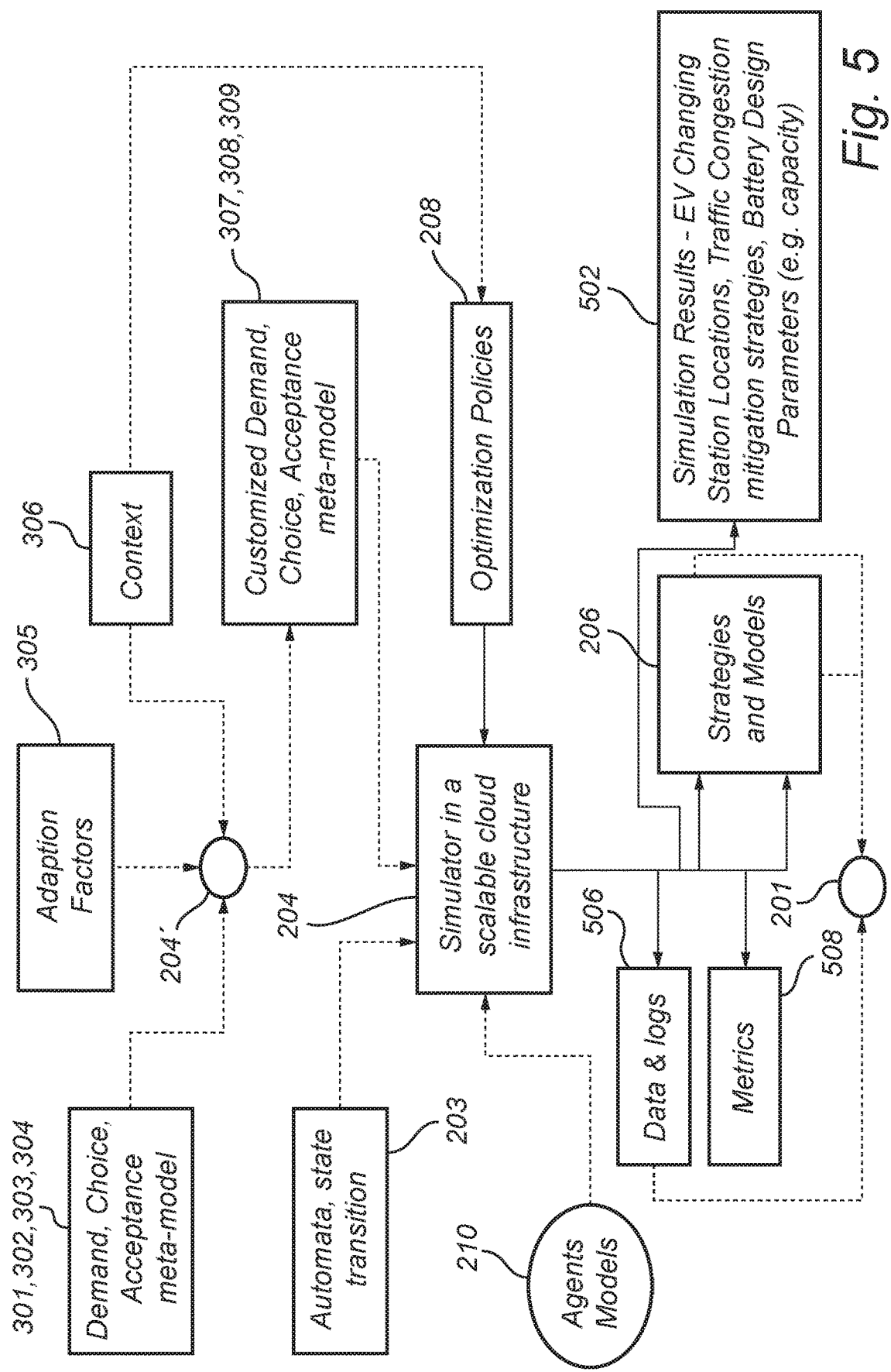
FIG. 5 conceptually illustrates a simulator module operation flow.

FIG. 5 conceptually illustrates a simulator module operation flow. A simulator module 204 takes the demand 307, acceptance 308, and intent models 309 as input. The models 307, 308, 309 are developed as described above with reference to FIG. 3. The models 307, 308, 309 may be provided as distributions (e.g. Poisson distributions) for arrival rates and arrival volumes at different context. Thus, the arrival rates and arrival volumes may vary from time of day to day of week to special days as well as different contextual conditions such as for example bridge closings or road works. Further, the simulation module 204 receives optimization policies 208 for the parties and geographical area.

The simulator module 204 may further take agent models 210 and models 203 for state transitions as inputs.

The simulator module outputs a set of data, logs 506 and metrics 508, as well as model strategies 206. The transactions (e.g. activities performed by the simulator module) during the simulation run are logged such that the simulations may be recreated at a late time. Further, each simulation outputs a set of metrics 508. The metrics are described with reference to FIG. 4. The data and logs may be used by the control unit 201 when attempting to reach Nash equilibrium. Further, the models strategies 206 include value iterations and policy declarations for Reinforcement learning as well as strategies for Nash equilibrium calculations under different conditions provided by the context data. The models strategies will be used by the control unit in orchestrating the resources.

Figure 6:
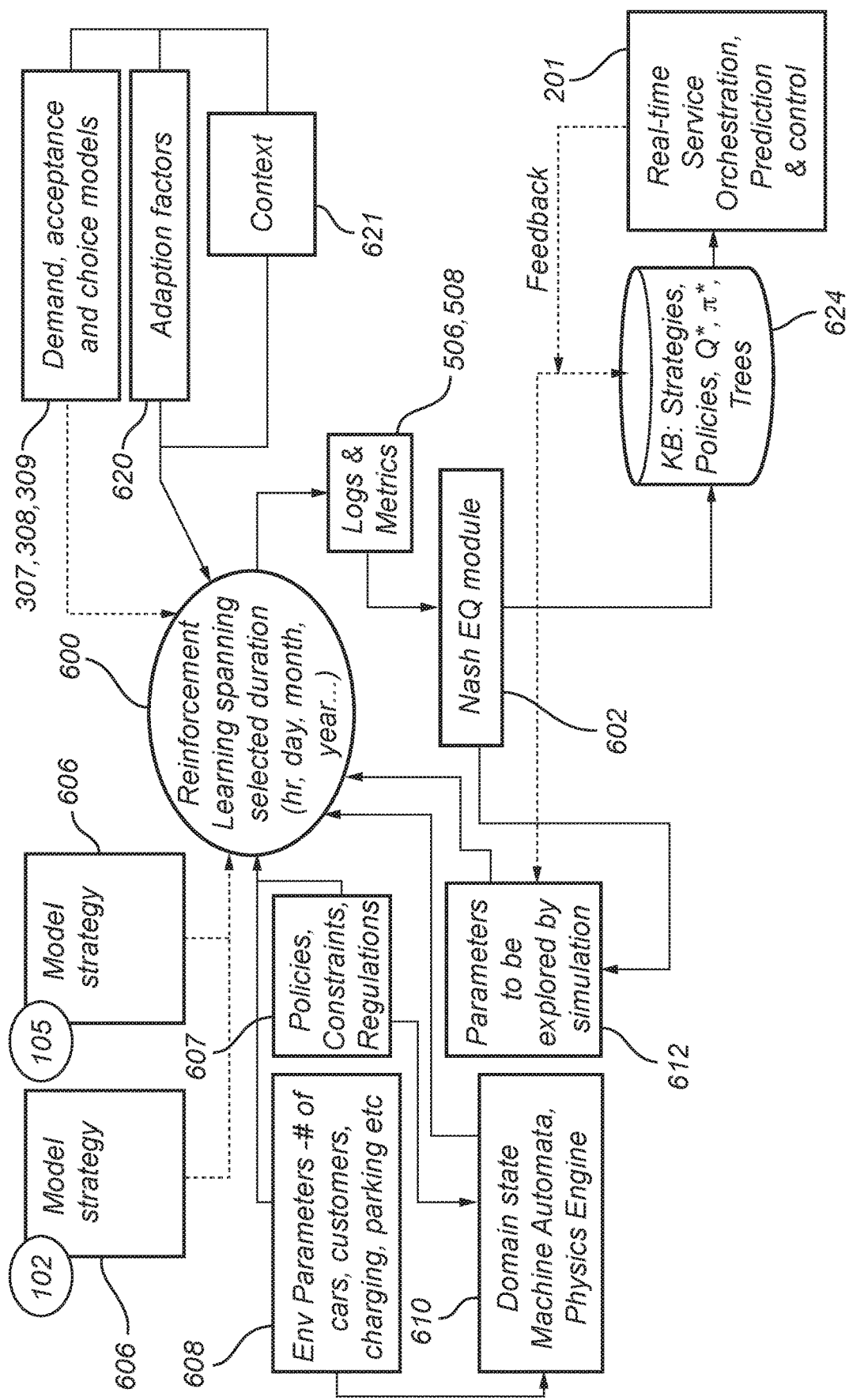
FIG. 6 schematically illustrates a reinforcement learning process in accordance with the inventive concept.

FIG. 6 schematically illustrates an overview of a reinforcement learning process in accordance with various embodiments of the inventive concept.

The reinforcement learning module 600 receives the demand 307, acceptance 308, and intent 309 models 606 including strategies from the parties (102, 105), and further regulations and constraints 607, such as traffic rules, and data indicative of the state and transitions 610 of the mobility resources. The state and transitions 610 of the mobility resources may depend on and be adapted by the regulations, policies and regulations 607, and optionally environmental parameters, such as number of vehicles, customers, etc. 608 in the area. Based on the inputs, the reinforcement learning module 600 provides a set of logs 506 and metrics 508.

The reward function of the reinforcement learning module 600 is the outcome of the Nash equilibrium calculation where the goal of the reinforcement learning module 600 is to find sets of metrics which satisfies the Nash equilibrium condition. The Nash equilibrium calculating module 602 calculates the Nash equilibrium based on the sets of metrics 508 and logs 506, and if the Nash equilibrium is near equilibrium within the deviation ($\epsilon$) ($\epsilon$ may be provided as a numeric value), control signals are sent to the control unit 201 for controlling the distribution of mobility resources in the predetermined geographical area. The control unit 201 may also feeds back data into the reinforcement learning module 600 for it to learn from real time actual events. This feedback loop is advantageous for learning because as much as the simulator module 204 can simulate a large number of conditions, it cannot still fully comprehend how the agents behave in real world. The reinforcement learning module 600 preferably applies deep reinforcement learning algorithms.

Figure 7:
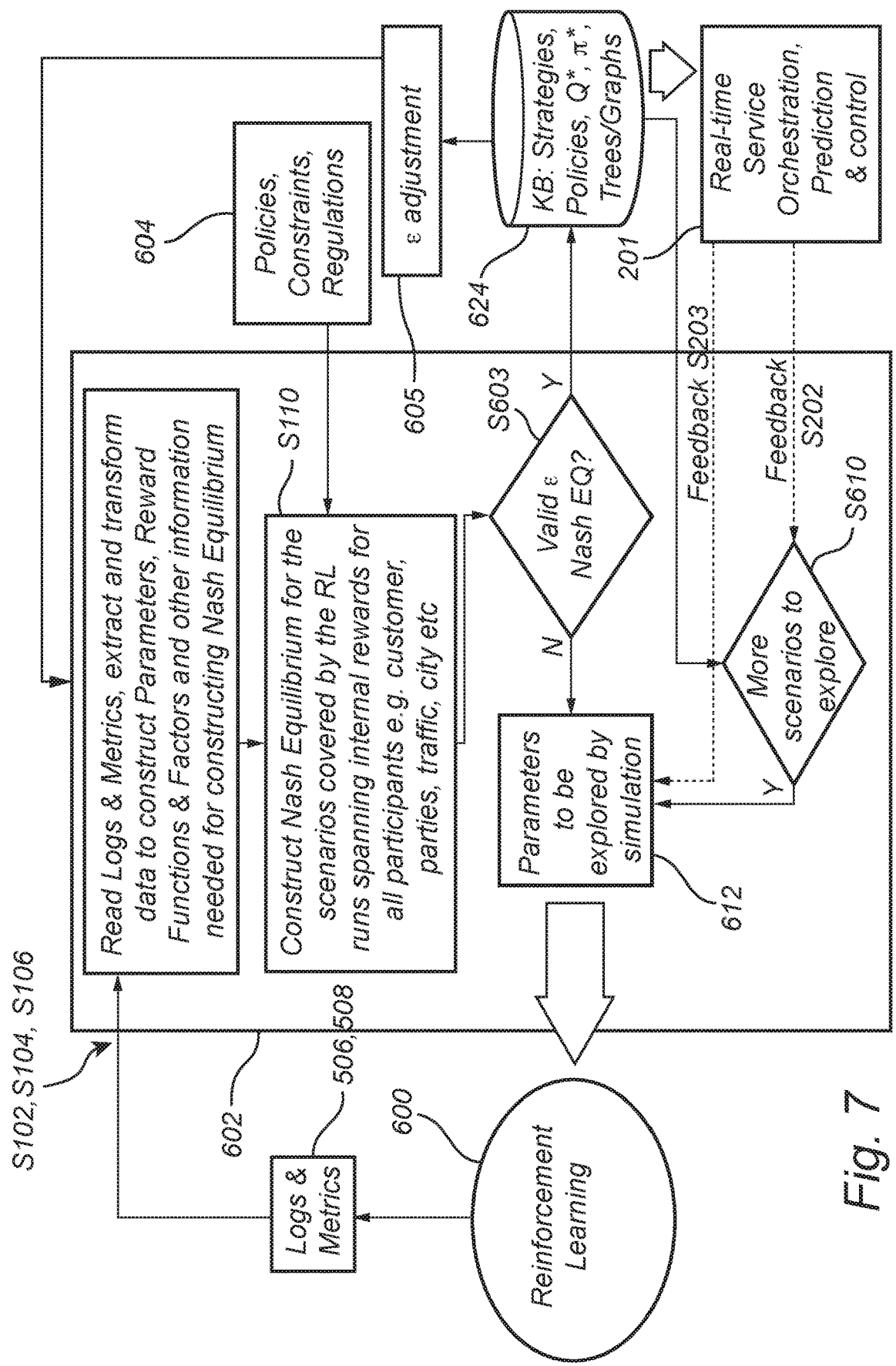
FIG. 7 schematically illustrates a reinforcement learning process for constructing Nash equilibrium in accordance with the inventive concept.

Now turning to FIG. 7, which provides a functional flow-chart for the Nash equilibrium calculation and evaluation, the Nash equilibrium calculating module 602 (which may be a software module) serves as a controller for seeking Nash equilibrium. Nash equilibrium calculating module 602 receives (S104, S102) logs and metrics 506, 508 from the reinforcement learning module 600. Further, the Nash equilibrium calculating module 602 receives (S106) models including strategies including e.g. parameters, functions, and rewards needed for establishing the Nash equilibrium. The Nash equilibrium calculating module 602 may further receive policies and other constraints and regulations 604 related to the predetermined area 100.

The Nash equilibrium is constructed (S110) for a number of possible scenarios provided from the reinforcement learning module 600, and is based on the metrics and optimization policies for the parties and the individual reward functions for the resources (i.e. the autonomous vehicles 103a-c, 106a-c). If the Nash equilibrium is not near equilibrium within a deviation ($\epsilon$) (S603), parameters 612 from the Nash equilibrium (e.g. resulting metrics) are sent to the reinforcement learning module 600 which may be part of the simulation module. Multiple Nash equilibriums may be possible between parties. The allowed deviations (c) are provided to the reinforcement learning module 600 from the parties 606 as part of their model strategies.

If the Nash equilibrium condition is satisfied in S603, then control signals are sent to the control unit 201 for controlling the distribution of mobility resources in the predetermined geographical area. The inferences, learned strategies and policies along with the model representations are stored in the database 624. The system can use the models during real-time orchestration.

Optionally, the deviation ($\epsilon$) may be adjusted S605 and fed back to the Nash equilibrium calculating module 602. This dynamic adjustment provides agility and flexibility and the ability to reflect the real world changing scenarios. Thus, changes in the predetermined are may cause the original $\epsilon$ to be too high or too low. Thus, the allowed deviation ($\epsilon$) may be dynamically adjusted based on real-time feedback.

In addition, the system control unit 201 also feeds back S202 into the reinforcement leaning module 600, for it to learn from real time actual events. In other words, if it is determined S610 that further scenarios have been found not yet covered in the reinforcement learning process, this scenario will be provided to the next iteration of reinforcement learning in the module 600. Additional feedback may be provided S203 from the control unit 201 in the form of metrics or parameters or model artefacts that may have changed due to learning form the real world.

Figure 8:
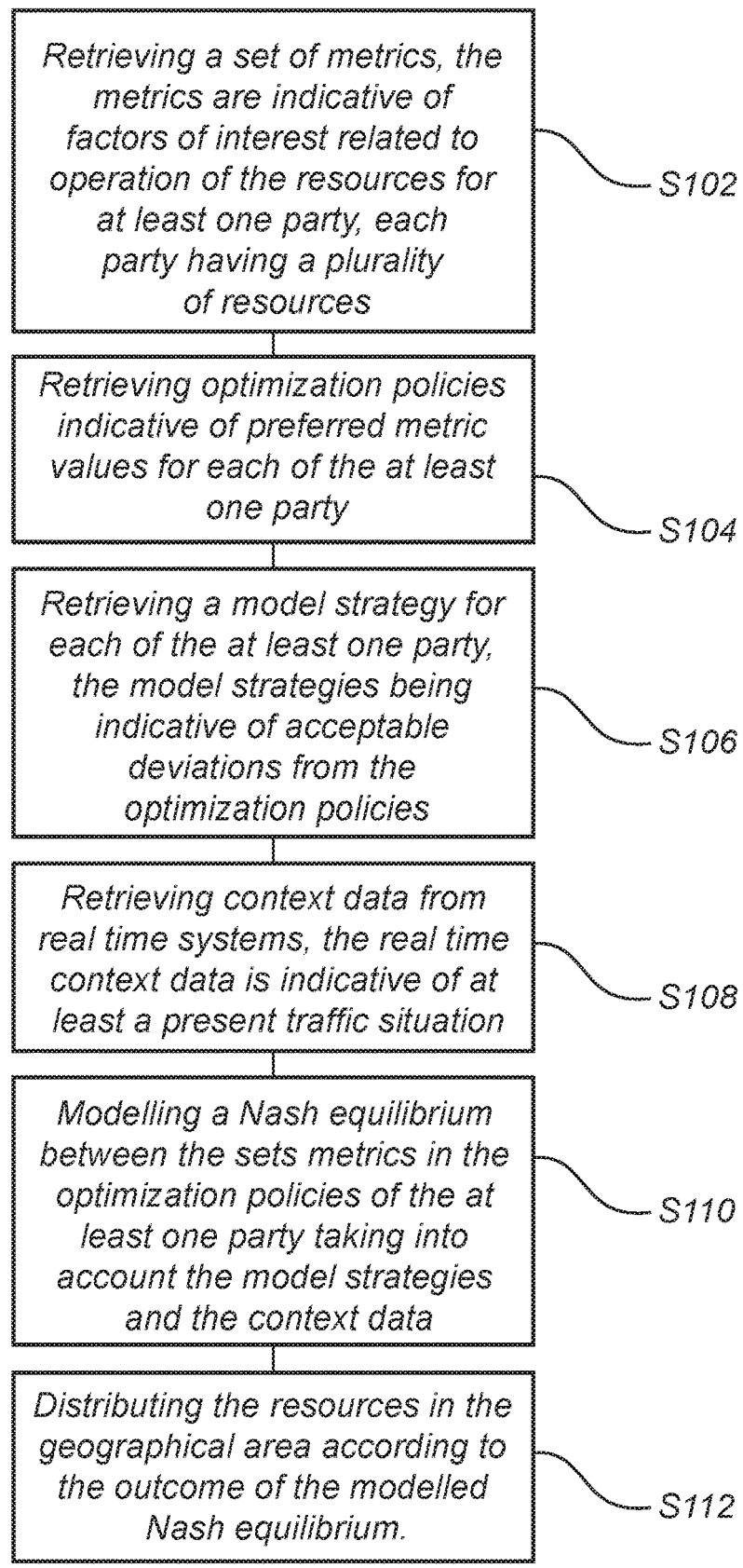
FIG. 8 is a flow chart of method steps according to embodiments of the invention.

FIG. 8 is a flow chart of method steps according to embodiments of the invention. A set of metrics is retrieved in step S102, the metrics are indicative of factors of interest related to operation of the resources for at least two parties, each party having a plurality of resources. In step S104 is optimization policies retrieved and are indicative of preferred metric values for each of the at least two parties. Further, in step S106 is a model strategy retrieved for each of the at least two parties, the model strategies being indicative of acceptable deviations from the optimization policies. Context data from real time systems is retrieved in step S108, the context data is indicative of at least a present traffic situation. In step S110 is a Nash equilibrium modelled between the sets metrics in the optimization policies of the at least two parties taking into account the model strategies and the context data. The resources in the geographical area are distributed according to the outcome of the modelled Nash equilibrium in step S112.

The Reinforcement Learning mechanisms are applied to infer choice and demand patterns from simulation runs based on the distributions. It is also used to learn from feedback from real world situations. Another flow that implements the reinforcement learning is to find the anomalies—intentional or a deviation during real world orchestration flows. The Reinforcement Learning layer consists of codifying the states from the finite state automata, capture the state transitions, derive the Nash equilibrium at the states we are interested in and then iterate value and policy based on the equilibrium values. The parameters that are part of the context will be changed for each sets of episodes and that change and associated values/policies would be mapped in the reinforcement layer. The reward and the value are, in fact, function of the context—it is this equilibrium seeking reinforcement agents that gives the system ability to manage when a bridge closes or traffic surges or at the end of an event. These are all contexts and the rewards differ in each case. Moreover, the rewards are driven by the optimization policies—for example, the reward under profit maximization policy is different from reward under market share maximization. In fact, the reward function in this patent is a weighted function of multiple optimization policies—so one can construct a policy that weighs heavily on the maximization of revenue but also has some importance on market share.

The control functionality of the present disclosure may be implemented using existing computer processors, or by a special purpose computer processor for an appropriate system, incorporated for this or another purpose, or by a hardwire system. Embodiments within the scope of the present disclosure include program products including machine-readable medium for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media.

Machine-executable instructions include, for example, instructions and data which cause a general purpose computer, special purpose computer, or special purpose processing machines to perform a certain function or group of functions.

Although the figures may show a sequence, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A method for distributing resources in a predetermined geographical area, the method comprising:
    retrieving, via a communications connection, at a memory storing instructions executed by a processor to operate as a control unit, a set of metrics from at least two parties comprising at least two of a mobility service provider, a package delivery operator, a charging station operator, an infrastructure provider, and a user of any thereof, the set of metrics including separate metrics for each of the at least two parties, each of the separate metrics indicative of factors of interest related to operation of the resources for a respective party of the at least two parties, each party having a plurality of resources,
    retrieving, via the communications connection, at the control unit, optimization policies from the at least two parties, the optimization policies including an optimization policy for each of the at least two parties, each of the optimization policies being indicative of preferred metric values for the respective party,
    retrieving, at the control unit, models comprising strategies for distributing resources of the plurality of resources from each of the at least two parties in the predetermined area, the models based on learning from a set of scenarios for distributing resources, wherein the models comprise a demand model, an acceptance model, and an intent model,
    wherein retrieving the models comprises:
        constructing the demand model based on a demand meta-model and context and place information, the demand model adapted to predict transportation need, wherein the demand meta-model is formed by retrieving transportation data from one or more of a transportation data provider and an infrastructure data provider, aggregating the demand meta-model across multiple available transportation modes, and training the demand meta-model for the predetermined area, and wherein the context and place information is retrieved from one or more of a traffic data provider, an infrastructure data provider, and an event data provider,
        constructing the acceptance model based on the demand model, party mobility preferences, and transportation options, the acceptance model adapted to predict transportation preferences, and
        generating the intent model based on an arrival coordinate and venue,
    retrieving, via the communications connection, at the control unit, context data from real time systems, the context data indicative of at least a present traffic situation,
    establishing, at the control unit, a Nash equilibrium between the metrics in the optimization policies of the at least two parties taking into account the models and the context data,
    via the control unit, based on an outcome of the established Nash equilibrium, distributing the resources in the geographical area, the distribution of the resources optimally satisfying the metrics in the optimization policies of the at least two of the mobility service provider, the package delivery operator, the charging station operator, the infrastructure provider, and the user of any thereof taking into account the models and the context data; and
    via the control unit, directing certain autonomous vehicles of the resources to explore the predetermined area with proximity sensors and cameras, receiving models for observed state transitions associated with the certain autonomous vehicles, and incorporating the models for the observed state transitions into a revised Nash equilibrium.

2. The method according to claim 1, wherein the models are based on training with reinforcement learning algorithms.

3. The method according to claim 1, comprising:
    receiving a request for the resources, the request comprising a set of preferred metrics, and
    establishing the Nash equilibrium based further on the request.

4. The method according to claim 3, comprising:
    providing an offer based on the request and the outcome of the established Nash equilibrium,
    receiving a response to the offer, and
    distributing the resources further based on the response.

5. The method according to claim 1, further comprising
    calculating adaptation factors for a further geographical area not comprised in the predetermined area based on at least area size and population density at places of interest,
    scaling properties of the model for the predetermined area to the further area to form an adapted model, and
    using the adapted model for distributing the resources in the further area.

6. The method according to claim 1, further comprising:
    training the model based on the outcome of the distribution of the resources and reinforcement learning.

7. The method according to claim 1, wherein the resources are mobility units.

8. The method according to claim 1, wherein the Nash equilibrium is satisfied when the equilibrium between the sets of metrics is within an allowed deviation ($\epsilon$).

9. The method according to claim 1, further comprising modifying one or more of the models, re-establishing the Nash equilibrium, and, if a new state of the Nash equilibrium differs from an old state of the Nash equilibrium by more than a predetermined amount, only then redistributing the resources in the geographical area based on the re-established Nash equilibrium.

10. A system for distributing resources in a predetermined geographical area, the system comprising:
  memory storing instructions executed by a processor to operate as a control unit configured to:
    retrieve, via a communications connection, a set of metrics from at least two parties, the set of metrics including separate metrics for each of the at least two parties, each of the separate metrics indicative of factors of interest related to operation of the resources for a respective party of the at least two parties, each party having a plurality of resources,
    retrieve, via the communications connection, optimization policies from at least two parties, the optimization policies including an optimization policy for each of the at least two parties, each of the optimization policies being indicative of preferred metric values for the respective party,
    retrieve models comprising strategies for distributing resources of the plurality of resources from each of the at least two parties in the predetermined area, the models based on learning from a set of scenarios for distributing resources, wherein the models comprise a demand model, an acceptance model, and an intent model,
    wherein retrieving the models comprises:
      constructing the demand model based on a demand meta-model and context and place information, the demand model adapted to predict transportation need, wherein the demand meta-model is formed by retrieving transportation data from one or more of a transportation data provider and an infrastructure data provider, aggregating the demand meta-model across multiple available transportation modes, and training the demand meta-model for the predetermined area, and wherein the context and place information is retrieved from one or more of a traffic data provider, an infrastructure data provider, and an event data provider,
      constructing the acceptance model based on the demand model, party mobility preferences, and transportation options, the acceptance model adapted to predict transportation preferences, and
      generating the intent model based on an arrival coordinate and venue,
    retrieve, via the communications connection, context data from real time systems, the context data indicative of at least a present traffic situation,
    establish a Nash equilibrium between the metrics in the optimization policies of the at least two parties taking into account the models and the context data,
    based on an outcome of the established Nash equilibrium, distribute the resources in the geographical area, the distribution of the resources optimally satisfying the metrics in the optimization policies of the at least two of the mobility service provider, the package delivery operator, the charging station operator, the infrastructure provider, and the user of any thereof taking into account the models and the context data; and
    direct certain autonomous vehicles of the resources to explore the predetermined area with proximity sensors and cameras, receive models for observed state transitions associated with the certain autonomous vehicles, and incorporate the models for the observed state transitions into a revised Nash equilibrium.

11. The system according to claim 10, the memory further storing instructions executed by the processor to operate as a simulator module configured to:
  generate the models based on reinforcement learning algorithms.

12. The system according to claim 11, further comprising a server, wherein the memory storing the instructions executed by the processor to operate as the control unit and the simulator module is arranged on the server.

13. The method system to claim 10, wherein the control unit is further configured to modify one or more of the models, re-establish the Nash equilibrium, and, if a new state of the Nash equilibrium differs from an old state of the Nash equilibrium by more than a predetermined amount, only then redistribute the resources in the geographical area based on the re-established Nash equilibrium.

14. A computer program product comprising a non-transitory computer readable medium having stored thereon computer program means comprising instructions stored in a memory and executed by a processor to operate as a control unit for distributing resources in a predetermined geographical area, wherein the instructions comprise steps for:
  retrieving, via a communications connection, a set of metrics from at least two parties comprising at least two of a mobility service provider, a package delivery operator, a charging station operator, an infrastructure provider, and a user of any thereof, the set of metrics including separate metrics for each of the at least two parties, each of the separate metrics indicative of factors of interest related to operation of the resources for a respective party of the at least two parties, each party having a plurality of resources,
  retrieving, via the communications connection, optimization policies from the at least two parties, the optimization policies including an optimization policy for each of the at least two parties, each of the optimization policies being indicative of preferred metric values for the respective party,
  retrieving models comprising strategies for distributing resources of the plurality of resources from each of the at least two parties in the predetermined area, the models based on learning from a set of scenarios for distributing resources, wherein the models comprise a demand model, an acceptance model, and an intent model,
  wherein retrieving the models comprises:
    constructing the demand model based on a demand meta-model and context and place information, the demand model adapted to predict transportation need, wherein the demand meta-model is formed by retrieving transportation data from one or more of a transportation data provider and an infrastructure data provider, aggregating the demand meta-model across multiple available transportation modes, and training the demand meta-model for the predetermined area, and wherein the context and place information is retrieved from one or more of a traffic data provider, an infrastructure data provider, and an event data provider,
    constructing the acceptance model based on the demand model, party mobility preferences, and transportation options, the acceptance model adapted to predict transportation preferences, and generating the intent model based on an arrival coordinate and venue, retrieving, via the communications connection, context data from real time systems, the context data indicative of at least a present traffic situation, establishing a Nash equilibrium between the metrics in the optimization policies of the at least two parties taking into account the models and the context data, based on an outcome of the established Nash equilibrium, distributing the resources in the geographical area, the distribution of the resources optimally satisfying the metrics in the optimization policies of the at least two of the mobility service provider, the package delivery operator, the charging station operator, the infrastructure provider, and the user of any thereof taking into account the models and the context data; and directing certain autonomous vehicles of the resources to explore the predetermined area with proximity sensors and cameras, receiving models for observed state transitions associated with the certain autonomous vehicles, and incorporating the models for the observed state transitions into a revised Nash equilibrium.

15. The computer program product according to claim 14, wherein the models are based on training with reinforcement learning algorithms.

16. The computer program product according to claim 14, the instructions further comprising steps for:
receiving a request for the resources, the request comprising a set of preferred metrics, and
establishing the Nash equilibrium based further on the request.

17. The computer program product according to claim 16, the instructions further comprising steps for:
providing an offer based on the request and the outcome of the established Nash equilibrium,
receiving a response to the offer, and
distributing the resources further based on the response.

18. The computer program product according to claim 14, wherein the Nash equilibrium is satisfied when the equilibrium between the sets of metrics is within an allowed deviation ($\epsilon$).

19. The computer program product according to claim 14, wherein the instructions further comprise steps for modifying one or more of the models, re-establishing the Nash equilibrium, and, if a new state of the Nash equilibrium differs from an old state of the Nash equilibrium by more than a predetermined amount, only then redistributing the resources in the geographical area based on the re-established Nash equilibrium.

* * * * *